Dec. 8, 1925. 1,564,705
W. W. ODELL ET AL
REFRIGERATING APPARATUS
Filed July 26, 1922 4 Sheets-Sheet 1

Inventors
Wm. W. Odell
C. W. Seibel

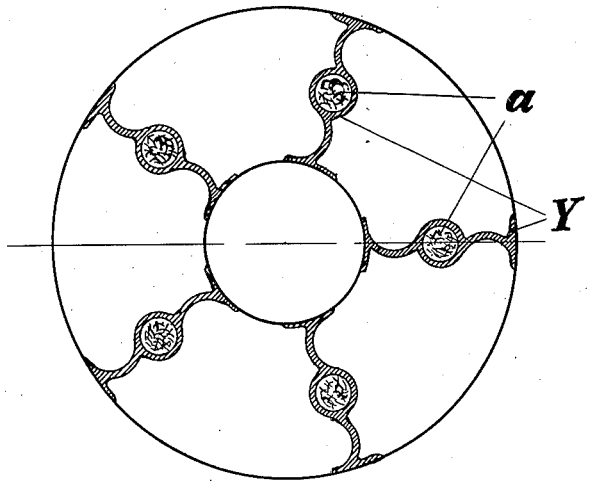
Fig-3
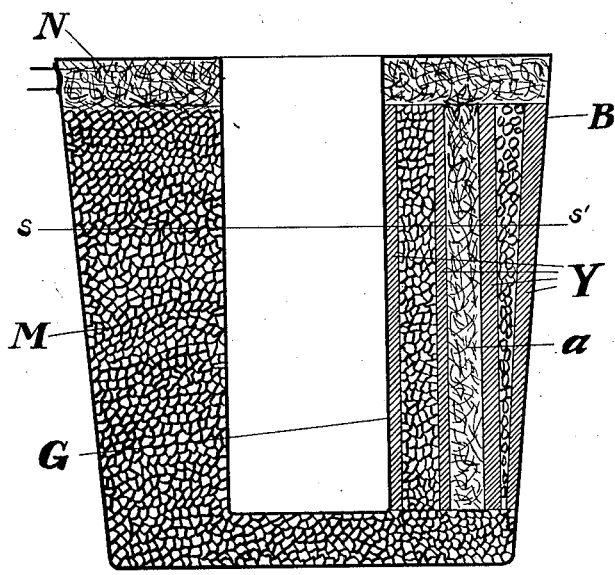
Fig-2
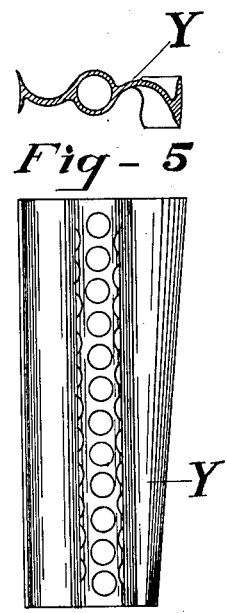
Fig-5
Fig-4
Inventors.
Wm. W. Odell

Dec. 8, 1925.

W. W. ODELL ET AL 1,564,705

REFRIGERATING APPARATUS

Filed July 26, 1922  4 Sheets-Sheet 3

Inventors
Wm. W. Odell
C. W. Seibel

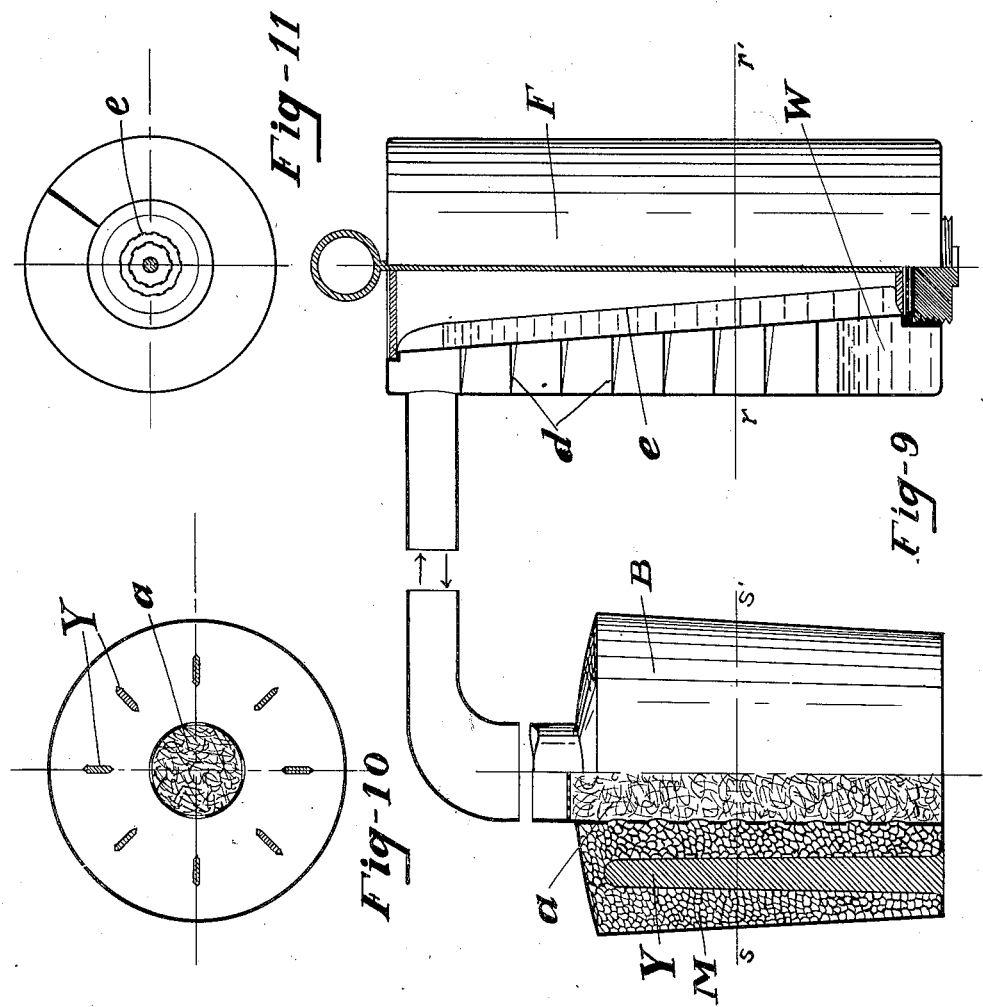

Patented Dec. 8, 1925.

1,564,705

UNITED STATES PATENT OFFICE.

WILLIAM W. ODELL, OF WASHINGTON, DISTRICT OF COLUMBIA, AND CLIFFORD W. SEIBEL, OF BETHESDA, MARYLAND.

REFRIGERATING APPARATUS.

Application filed July 26, 1922. Serial No. 577,771.

*To all whom it may concern:*

Be it known that we, WILLIAM W. ODELL and CLIFFORD W. SEIBEL, citizens of the United States and residing, respectively, at Washington, District of Columbia, and Bethesda, Maryland, county of Montgomery, have invented new and useful Improvements in Refrigerating Apparatus.

This invention relates to an apparatus for the production of cold and refrigeration without machinery such as the pumps and compressors common to most present day refrigerating apparatus and devices. The principle made use of is the absorption and adsorption of gases and vapors by a solid rather than a liquid absorbent, and the production of low temperatures by the evaporation of the condensed (liquefied) gases; the cycle being completed by subsequently expelling the gas from the absorbent by means of heat, cooling and condensing the gas to a liquid.

The objects of this invention are:

(1) To provide in a single unit a gas tight apparatus for the production of low temperatures and refrigeration in the operation of which no pumps, compressors or the like are necessary.

(2) To provide for the use of a solid absorbent instead of a liquid, taking advantage not only of the absorption properties but also the adsorption properties of certain substances, for example, carbon, activated carbon, silica gel, etc.

(3) To provide a positive means of condensing and liquefying the gas after its liberation from the absorbent previous to its entry into the refrigerating end (cold end) of the apparatus.

(4) To provide a means of draining the liquid gas into the refrigerating end of the apparatus.

(5) To provide an apparatus for household refrigeration in which regularly shaped blocks of ice or other frozen material can be made and in which the mold for freezing liquids is so shaped as to be suitable for cooling and freezing edibles.

(6) To provide an ice freezing mold that is itself a part of the refrigerating unit and which is so designed that the ice may be freed therefrom without injury to the apparatus.

(7) To provide a refrigerating chamber with a larger surface than that of the usual symmetrical vessels now in use, for the purpose of producing a more rapid evaporation of the liquefied gas, allowing a greater heat transfer per unit of time.

(8) To provide a means for causing all of the cold gas from the evaporation of the liquid to pass into contact with the ice making mold.

(9) To provide a means of utilizing the maximum amount of the "cold" produced.

(10) To provide a means of heating the generator from within.

(11) To provide a means for hastening the transfer of heat (conduction) into the absorbent and in turn for facilitating the cooling of the absorbent during a subsequent stage of operation.

(12) To provide a means whereby the heating of the absorbent is started by thermostatic control according to the temperature in the refrigerator and a means for discontinuing the heating according to the temperature in the absorbent material, by thermostatic control. (The thermostat itself is not a part of this invention.)

(13) To provide a porous medium for the transfer of gas to and from the absorbent material which also acts as a barrier to the passage of particles of the absorbent itself.

(14) To provide a positive means of liquefying the gas in an isolated chamber, which is part of the apparatus, previous to its entry into the evaporating chamber so as to take advantage of all of the cooling due to the heat absorption caused by the latent heat of evaporation of the liquefied gas.

(15) To provide a means of speeding up the refrigerating process and freezing when occasion requires.

(16) To provide a solid and continuous absorbent material with a large absorption surface and with a means of conducting heat into and away from it and with a means of conducting gas to and from the interior of said absorbent.

Figure 2 is a vertical section of the generator pot only, and illustrates the position of the absorbent, heat-conductors, fibrous material above absorbent and the upright conduits in the absorbent for the passage of refrigerant.

Figure 3 is a horizontal section of the generator pot only, through S S' of Figure 2, and shows only the generator walls and the position of the conduit heat-conductor.

Figure 4 is an elevation of a conduit heat-conductor, and Figure 5 is a top view of the same.

Figure 9 is an elevation of another design of an absorption refrigeration apparatus utilizing the same principles, and which is more suitable for portable use. A part of the outer surface is cut away in the figure to show the interior in vertical section.

Figure 10 is a horizontal section through S S' of the generator shown in Figure 9.

Figure 11 is a horizontal section through r r' of the condenser and ice mold shown in Figure 9.

Figure 1:
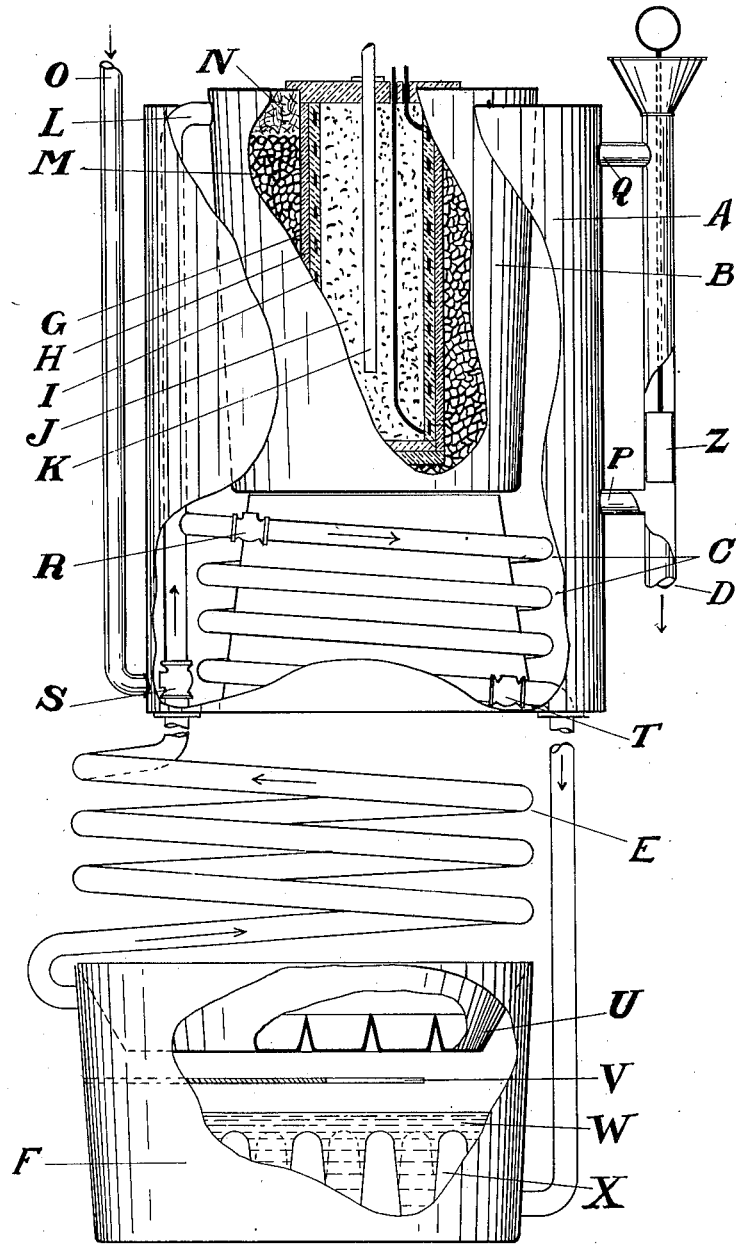
Figure 1 shows in elevation the assembled refrigeration apparatus comprising the connected generator, condenser, evaporator, and secondary cooling coil. A part of the outer surfaces of the generator, cooling vessel, overflow from cooling vessel, evaporator and ice mold are cut away here for the purpose of showing more clearly the interior in section.
Figure 7:
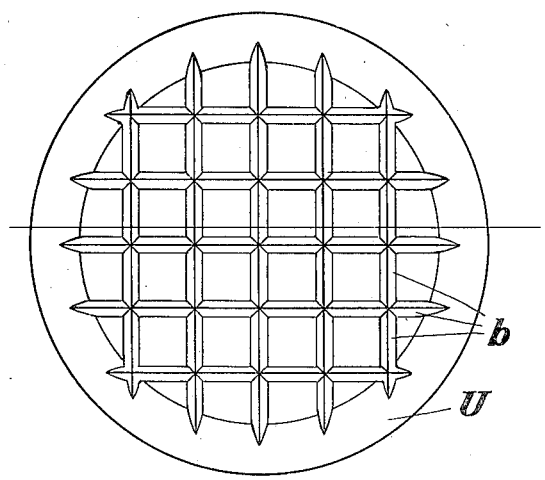
Figure 7 is a top view of the ice mold.
Figure 6:
Figure 6 is an elevation of the freezing mold only, with a portion of its surface cut away to show a section of the interior.
Figure 8:
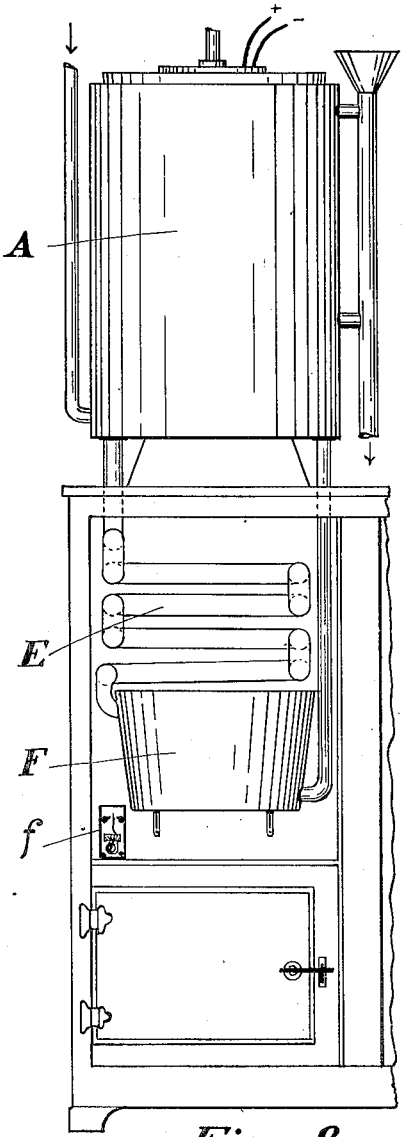
Figure 8 is an elevation of the refrigerating apparatus assembled and in place in a refrigerator.

In Figure 1, A is a container for the generator pot B and the condensing coil C. D is the offtake or drain for the cooling and condensing water and E is the refrigerating coil connecting with F the cold end of the apparatus in which the evaporation of the liquid takes place. G is the inner wall of the generator which latter has a hollowed middle portion, and H is insulation. I is a heating element embedded in refractory material and J is insulating filler. K is a thermostat element adapted to indicate the temperature of the heating element and relatively the temperature of the absorbent material, L is the offtake for gas liberated from the absorbent material M, and N is the porous material above M. O is the inlet for cooling water which overflows at P and Q. Z is a valve used to cause the water to rise in A to the upper overflow Q, and is a hollow cylinder slide valve. R, S, and T are check valves. Invention is not claimed on the internally automatic operating valve as such. U is the dished freezing mold and is a part of F. V is a baffle for causing the cold gas upon leaving F to pass in contact with U previous to entering coil E. W is the condensed (liquefied) gas in F. X is the finger like indentures in the bottom of F, giving increased surface for the absorption of heat from the refrigerator. Y, shown in Figures 2, 3, 4 and 5 designates the conduit-forming heat conductors. A designates the fibrous filling material in conduits Y; in Figures 9 and 10 Y designates heat conductors but not a combined heat conductor and conduit for the refrigerant. In Figure 7 b designates the corrugations in the bottom of ice mold U. In Figure 8 f is the ice-box thermostat. In Figures 9 and 10 a is the fibrous material forming a conduit for the refrigerant. In Figures 9 and 11 e is the inner wall of the ice mold and is corrugated to relieve the pressure caused by expansion of the water upon freezing, and d is the baffle for causing the evaporated refrigerant to take a circuitous course about the surface of the freezing mold before returning to the generator.

The operation of the apparatus as shown in Figure 1 is as follows: Heat is applied to the generator B by starting the electric current thru heating element (coil) I. Heat is transmitted into the mass of absorbent M thru the wall by radiation, conduction and by means of the special heat conductors shown at Y Fig. 2. The absorbent on becoming warmed or heated liberates the absorbed and adsorbed gas which passes out thru L and check valve R into the cooling chamber (in this instance a coil) C. The gas can not pass thru the check valve T until a desired and predetermined differential pressure is reached between F and B. The gas thus liquefies in coil C and the heat of vaporization and some of the sensible are taken up (absorbed) by the water which enters container A thru O and overflows at P or at Q as desired. When a desired temperature is reached in the absorbent the thermostat control of which K in Figure 1 is the element causes the current flowing thru heating coil I to shut off. The absorbent now begins to cool and reabsorb and readsorb gas, lowering the pressure in the vapor return line, and thereby causes evaporation of the liquid in F. The evaporation of the liquid in F is accompanied by the production of cold and the lowering of the internal pressure in F thereby increasing the differential pressure between coil C and vessel F which causes the differential check valve T to operate expelling the liquid in coil C into vessel F where it is subsequently evaporated. The valves are so arranged that they are maintained at approximately the same temperature and at approximately a uniform temperature, being immersed as shown in Figure 1. After the absorbent has taken up its quota of gas and the temperature in the refrigerator has increased to a certain predetermined degree the heating current is automatically turned on by the action of the refrigerator thermostat shown at f in Figure 8. The cycle is now complete. The surface of E as well as of F may be used for cooling a refrigerator and is shown thus in Figure 8. When ice or other frozen liquid is desired the dished mold U is filled with the liquid. This mold is suitable for cooling edibles such as gelatine, desserts, etc. In case it is desired to hurry the freezing process it is only necessary to cool the generator more rapidly after heating, in other words make the cycle shorter. This is accomplished by using valve Z Figure 1; closing the overflow at P and allowing the overflow water to pass out thru Q. This valve may be operated by hand or it may be so connected as to operate by thermostat control. The latter is not shown for simplicity since the thermostats are not a part of this invention and the principle of their operation is well known. Water cooling of the generator B may also be resorted to when the apparatus is used in exceptionally hot climates or under heavy duty conditions. Generator B, as shown in Fig. 1, is so designed as to relieve strains due to expansion and contraction caused by heating and cooling.

This apparatus is different from any other so far as we are aware, in that the gas from the generator (subsequently condensed) is carried in a downward direction from the generator to the evaporating chamber F, and traverses a different course away from than toward the generator in the regular cycle.

We have found that a marked economy is realized by the use of the heat conductors shown in Figure 2 at Y, which we believe is not obtained in any other apparatus. We found that without coil E, Fig. 1, the gas returning to the generator leaves the refrigerating zone at too low a temperature and that when using such a coil and placed above F in a refrigerator an additional economy is realized. This further differentiates our apparatus from others so far as we are aware. Another difference is the retention and liquefaction of gas in a cooling chamber (a coil as shown in Figure 1 at C) by means of check valves so placed and so set that gas does not liquefy and give up heat in the refrigerating end of the apparatus. This we believe to be an important and distinct difference from other inventions. The liquefying chamber need not necessarily be a coil.

The freezing vessel in our apparatus is designed to expose a relatively thin sheet of liquid, and chiefly from beneath, to the cold gas from the evaporation of liquid gas. We found that with a deep layer of water the freezing took place on the bottom and the ice did not always rise thus decreasing the rate of heat transfer and rate of freezing of the liquid, and simultaneously leaving some water above the ice. In our apparatus a means is provided for overcoming this difficulty by increasing the heat transfer rate by means of the corrugations in the bottom of U Figure 1 which also aid in rejecting the ice from the mold without injury to the latter. These features also we believe are distinctly different from any apparatus heretofore devised. We do not confine ourselves to this particular design in utilizing this principle.

We found that when the evaporating chamber F was symmetrical and had a flat bottom the rate of heat exchange was not rapid enough and that by making a bottom with an enlarged surface as by indentures as shown at X in Figure 1, the refrigerating capacity of a given size apparatus is considerably increased. This feature in combination with the freezing vessel we believe to be new.

It will be seen that in the generator operation an economy of heat is realized by making the radiating surface (whereby the applied heat might be lost by radiation) as small as possible and by making the radiating surface for cooling as large as possible. This feature of internal heating and external cooling is, we believe, new. We do not however wish to limit ourselves to electric heating for gas or other fuel can readily be adapted to the same use taking advantage of the same principles.

A limiting factor in the use of solid absorbents—when present in small pieces—has been the spilling in transit and the carrying over of particles entrained in the gas, to the cooling chamber. This is prevented in our apparatus by inserting a layer of porous material, such as mineral wool, metal wool, etc, over the absorbent, as shown at N, Figure 1. This does not only act as a screen but also as a heat insulator preventing the rapid radiation of heat thru the top during the heating stage. This combination we also believe to be different from any other apparatus heretofore devised. The heat conductors which are shown at Y Figures 2, 3 and 4 are so shaped as to act as passages for gas to and from the absorbent, said passages are also filled with loose porous material as shown at a which further aid in preventing the passage of entrained particles over into the cooling chamber.

The relative sizes of the parts A, C, and F, Figure 1 are dependent on conditions, on the gas used and on the absorbents ability to "take up" the gas. It is desirable to use a gas that has a high latent heat of vaporization, a low boiling point, a low specific heat and a reasonably low critical pressure. We do not confine ourselves to a particular gas but for use in our apparatus; gases that may be successfully used are sulphur dioxide, methyl chloride, etc. It will be seen that for a given size of our apparatus there is a quite definite amount of gas that should be in the system, any appreciable variance from which affects the efficiency of operation. This is true since we are depending upon pressure conditions to bring about liquefaction in the cooling coil and upon a differential pressure of a definite amount for the release of the liquefied gas thru valve T into F.

In Figures 9, 10 and 11 are shown a form of our apparatus suited to the needs of tourists etc; the cooling-water container is not attached in order to economize space. In its operation heat is applied from a fire or other source to the generator B and meanwhile F is immersed in cold water. Subsequently B is removed from the fire and cooled whereupon F becomes cold and liquids may be cooled and frozen therein.

We recognize that the principle of utilizing the latent heat of vaporization of liquids in refrigerating apparatus is not new and we do not claim such as our own, but believe that our apparatus for the better utilization of this principle in conjunction with adsorption phenomena is new.

The solid absorbent is not necessarily in the form of granules but may be a continuous but porous mass formed by coking, carbonizing, cementing or the like. We have found that a continuous solid absorbent is equally as efficient as a granulated one and have been able to mold a mass suitable for this purpose in which the heat conductors and gas passages are incorporated. One method of accomplishing this is to mix certain gums and resins or ash free pitch or asphalt with a ground absorbent carbon until a mass is obtained which is suitable for carbonizing, mold it into the desired shape with the heat conductors and gas passages inserted, and then carbonize, applying heat from one side only, preferably from without and preferably under reduced pressure.

The word absorbent as used in this application does not only means a substance that absorbs refrigerating gases but includes also substances exhibiting the property of adsorption with respect to said gases.

We claim:

1. In an absorption refrigeration apparatus a generator, a means to condense the refrigerant from the generator, and a means to evaporate it and return it to said generator, a heating chamber within said generator, a removable heating element within said chamber contacting substantially the entire surface of the heating chamber which latter is contacted over substantially its entire outer surface by the absorbent.

2. In an absorption refrigeration apparatus a generator, a means to condense the refrigerant from the generator, a means to evaporate it and return it to said generator, a heating chamber within said generator, a removable heating element within said chamber and a means for cooling the absorbent retained in said generator from without, said means consisting in an outer separate jacket substantially surrounding said generator with a means of causing a cooling liquid to rise therein substantially surrounding said generator.

3. In an absorption refrigeration apparatus, a generator, a means to condense the refrigerant from the generator and a means to evaporate it and return it to an absorbent in said generator, a heating chamber within said generator, a removable heating element within said chamber with a thermostat element within the heating element.

4. In an internally heated generator of an absorption refrigeration apparatus the combination with an electric heating element of a thermostat element substantially incased by said heating element.

5. In an absorption refrigeration apparatus consisting of a generator, condenser and evaporating chamber suitably connected with means for circulating refrigerant, a substantially cylindrical cryptal chamber in said generator, a means of heating said chamber from within and heat conductors contacting longitudinally the outer surface of said chamber.

6. For use in a refrigerating apparatus employing a gas-absorbent, a solid molded and prepared absorbent of large porous surface with hollowed heat conductors imbedded therein.

7. In a refrigerating apparatus comprising a suitably connected generator, condenser, and evaporating chamber the combination with said generator of a common means for conducting heat into and away from the absorbent material retained therein and for conducting refrigerant to and from the absorbent, consisting in spaced heat conductors extending into the absorbent from the heating surface and into the absorbent from the cooling surface, coacting within the absorbent mass to form a conduit for the passage of refrigerant.

8. In a refrigeration apparatus comprising a suitably connected generator, condenser and evaporating chamber, the combination with said generator of a common means for conducting heat into and away from the absorbent material retained therein, consisting in spaced heat conductors extending into said absorbent from the heating and cooling surfaces of said generator and adapted to contact said absorbent without supporting same.

9. In an absorption refrigeration apparatus and in combination, a generator for retaining gas absorbent material, a substantially cylindrical cryptal heating chamber substantially in the middle thereof forming a relatively small inclosed heating surface; spaced heat conductors within said generator substantially parallel to the long axis of said chamber; a means of applying heat to said inner surface of said generator; a means of conducting the gas from the absorbent material to, and confining it in, a cooling and liquefying chamber, a means of cooling the gas and liquefying it in said chamber, and a means of discharging the liquefied gas into an evaporating chamber, evaporating it therein and returning it to said generator.

10. In an absorption refrigeration apparatus and in combination, a substantially cylindrical generator, adapted to be cooled from its outer surface for retaining gas absorbent material, a means of heating it from within; spaced metal heat conductors extending into said absorbent material from the heating and the outer surfaces, said conductors being substantially parallel to the axis of said generator; a means of conducting said gas to a condenser and condensing it therein, a means of conducting said condensed gas to an evaporator, evaporating it therein, and returning it to said generator.

11. In a refrigeration apparatus comprising a suitably connected generator, condenser and evaporating chamber, the combination in said generator of a means of heating the absorbent from within said generator comprising a removable heating element contacting the wall of a substantially cylindrical cryptal chamber in said generator, the other side of said wall contacting substantially continuously a mass of solid absorbent material, a means of cooling the absorbent from without, said heating surface being distinct from said cooling surface, a layer of fibrous material extending from the heating surface to the cooling surface in contact with the upper surface only of said absorbent material.

12. In an absorption refrigeration apparatus a generator having an offtake and a separate heating and cooling surface, a means to condense the refrigerant from the generator and a means to evaporate and return it to an absorbent in said generator, a layer of fibrous material preferably a nonconductor of heat, extending from the heating surface to the cooling surface and between the offtake and the absorbent but contacting said absorbent at its upper surface only.

13. In an absorption refrigeration apparatus the combination with a generator, condenser and evaporator suitably connected and with means for circulating refrigerant, of a cooling-liquid container common to and substantially confining said generator and condenser.

14. In a refrigerating apparatus comprising a generator, condenser and evaporator suitably connected and with means for circulating refrigerant including the necessary valves, a container for cooling fluid, said generator, condenser and valves being located within said container.

15. In a generator and evaporator of an absorption refrigeration apparatus a condenser suitably connected with means for circulating refrigerant including the necessary valves, said condenser being created by and confined between said valves, both condenser and valves being immersed in a common cooling medium.

16. In an absorption refrigeration apparatus the combination with a suitably connected generator, condenser and evaporator, of a common cooling container for and substantially confining said generator and condenser suitably connected to a supply of cooling liquid and a means to control the liquid cooling medium for cooling the condenser only, or for cooling both the condenser and generator.

17. The combination, in an absorption refrigeration apparatus comprising distinctly a generator, condenser and evaporator suitably connected for circulating a refrigerant, of a retainer for a cooling liquid substantially surrounding both generator and condenser, with an intake for said cooling liquid at approximately the bottom thereof with offtakes for said liquid at more than one level.

18. In an absorption refrigeration apparatus suitably connected for circulation of refrigerant, in combination a generator direct connected to a condenser and both substantially incased in a common cooling-medium container, said generator having a means for heating it from within, said container having a means of admitting cooling medium substantially at the bottom thereof and having offtakes for it at more than one level and a means for controlling discharge of said medium through said offtakes.

19. In a refrigeration apparatus comprising a generator, a condenser and an evaporator suitably connected for the circulation of refrigerant and having in particular a common conduit between the generator and the condenser and evaporator, means for confining it within the condenser and for releasing it therefrom said means consisting in an automatically and internally operating valve in the lower end of said condenser adapted to release the refrigerant from said condenser to the evaporator, only when a definite predetermined difference in pressure obtains between them.

20. For use in a generator of a refrigerating apparatus employing a gas-absorbent, a solid molded and prepared activated absorbent of large porous surface with heat conductors imbedded therein.

21. In an absorption refrigeration apparatus comprising a generator, condenser and evaporator, separate but connected for circulating a refrigerant, a common conduit for conducting said refrigerant from said generator to said condenser terminating at the condenser and for returning it from said evaporator to said generator by passing the condenser.

22. In a refrigerating apparatus comprising a generator, condenser and evaporator, with a means for circulating a refrigerant, a conduit for said refrigerant adapted to conduct said refrigerant downwardly from said generator to said condenser, a conduit adapted to conduct said refrigerant from said condenser downwardly to said evaporator and a conduit adapted to return said refrigerant from said evaporator in an upward direction to said generator.

23. In an absorption refrigeration apparatus the combination with a suitably connected generator, condenser and evaporator with means for circulating a refrigerant, of a secondary refrigerating coil situated above said evaporator and connected to it and to said generator, comprising a coil extending upwards from the evaporator and adapted for the passage of gas upwardly only, from said evaporator through it to said generator.

24. In combination with a generator and a condenser of an absorption refrigeration apparatus, an evaporator, the top surface of which forms an ice mould, an exit for the gaseous refrigerant and a substantially horizontal baffle within said evaporator below the top thereof and below said exit, and a secondary cooling coil rising from said evaporator and adapted to conduct said refrigerant upwardly to said generator.

25. In a refrigeration apparatus, an evaporator, means to supply liquid refrigerant to said evaporator, the top surface of said evaporator forming an ice mold, an exit for the gaseous refrigerant and a substantially horizontal baffle within the evaporator below the top thereof and below said exit.

26. In an absorption refrigeration apparatus comprising a suitably connected generator, condenser and evaporator, a mass of particles of carbonaceous absorbent material in the generator with hollowed heat conductors imbedded in said mass, the hollowed part of the heat conductors being in communication with the interior of the generator.

WM. W. ODELL.
CLIFFORD W. SEIBEL.